United States Patent [19]

Schantz

[11] 4,134,698

[45] Jan. 16, 1979

[54] COMPACT FAIL-SAFE BUZZER

[76] Inventor: Spencer C. Schantz, 16608 W. Rodgers Dr., New Berlin, Wis. 53151

[21] Appl. No.: 835,386

[22] Filed: Sep. 21, 1977

Related U.S. Application Data

[62] Division of Ser. No. 736,610, Oct. 28, 1976.

[51] Int. Cl.² ............................................. F16B 5/00
[52] U.S. Cl. ....................................... 403/3; 403/24; 403/353; 335/202; 200/295
[58] Field of Search ............... 403/353, 24, 3; 16/172; 248/222.1, 222.2, 222.3; 335/202; 200/295, 293, 296

[56] References Cited

U.S. PATENT DOCUMENTS

| | | | |
|---|---|---|---|
| 263,636 | 8/1882 | Weiss | 16/172 X |
| 1,373,015 | 3/1921 | Moses | 335/202 |
| 2,587,912 | 3/1952 | Simpson | 248/222.2 X |
| 3,092,701 | 6/1963 | Sikorski | 335/202 X |
| 3,199,683 | 8/1965 | Graswich | 248/222.2 X |

*Primary Examiner*—Andrew V. Kundrat

*Attorney, Agent, or Firm*—Wheeler, Morsell, House & Fuller

[57] ABSTRACT

A coil is wound on a hollow plastic bobbin and mounted in a U-shaped ferromagnetic frame, there being a pair of aligned bosses on opposite sides of the bobbin bore at one end thereof fitting into cooperating slots in the frame. A ferromagnetic core is axially movable within the hollow bobbin and is urged away from the bottom of the frame by a leaf spring. A compact plastic housing covers the bobbin, coil, and the upper portion of the frame, and electric terminals, mounted in pockets at the top of the bobbin, project through slots in the housing to the exterior. Portions of the bobbin are extruded into openings in the base of the terminals to hold them in place, and a pair of tabs on the bobbin interact with slots in the housing, and posts on the inside corners of the housing form abutments to prevent over-insertion of the tabs in the slots. A hook on the bottom of the frame is shaped to be engageable with an opening in external support elements of differing thickness to facilitate installation. The coil contains a relatively fine gauge wire which acts as a fuse if the buzzer is energized beyond a predetermined time period.

2 Claims, 6 Drawing Figures

U.S. Patent
Jan. 16, 1979
4,134,698
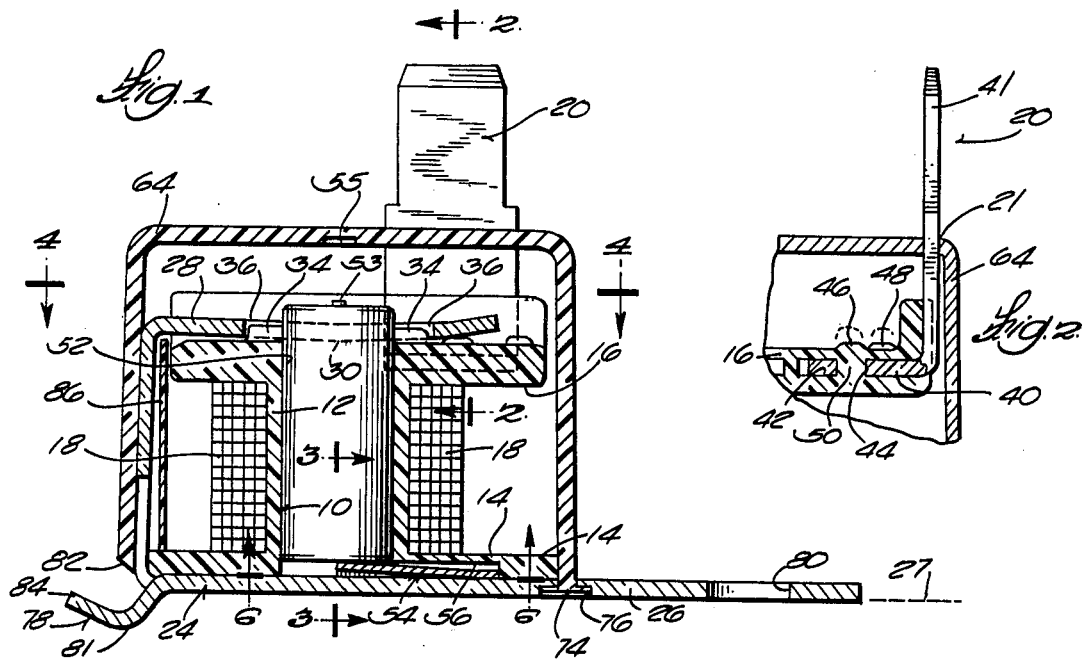
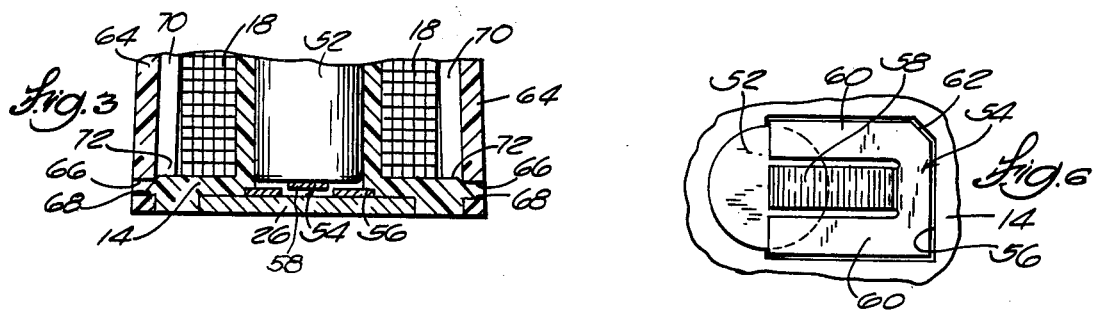
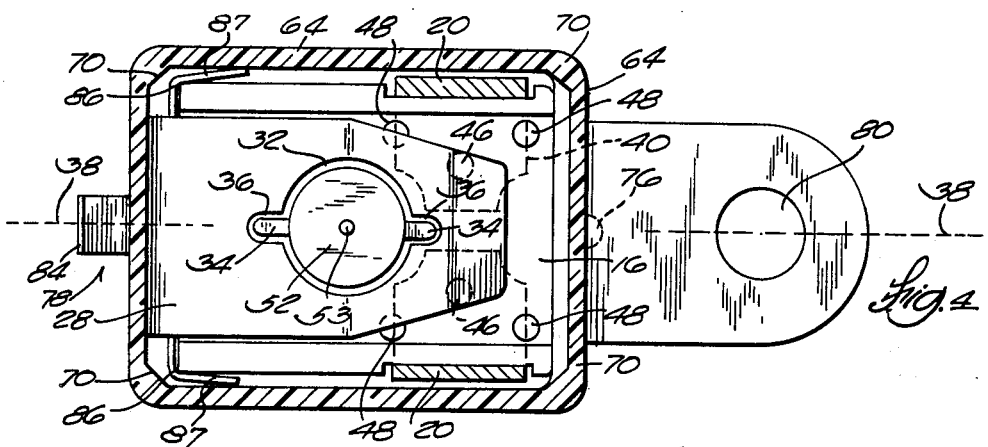
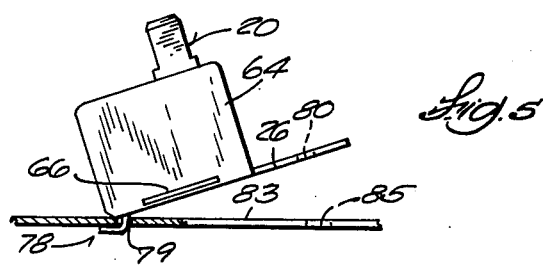

COMPACT FAIL-SAFE BUZZER

This is a divisional of application Ser. No. 736,610, filed Oct. 28, 1976.

BACKGROUND OF THE INVENTION

This invention relates to low cost A.C. buzzers of the type wherein a ferromagnetic element is intermittently drawn toward a coil and is intermittently moved away from the coil by a spring, intermittently striking an adjacent element to produce a buzzing sound. In the past, such buzzers have traditionally comprised a flexible U-shaped ferromagnetic frame with a coil attached to one arm of the frame and with the other arm of the frame serving as the buzzing element as it is intermittently drawn by the coil's magnetic field into contact with the coil bobbin and then is moved away from the bobbin by the resiliency of the frame. However, such buzzers have an unpleasant rasping sound and also are liable to become misaligned during handling and installation due to the exposed movable end of the frame.

SUMMARY OF THE INVENTION

The buzzer of this invention comprises a totally enclosed cylindrical core which is axially movable within a solenoid coil bobbin and which intermittently strikes one arm of a relatively rigid U-shaped ferromagnetic frame to produce a crisp and more pleasing buzzing sound free of the inherent harmonics caused by the flexing frame of the prior art buzzers. Means is included for facilitating assembly and for holding the parts in proper position, and the total enclosure of the core prevents misalignment caused by handling.

One additional object is to provide, in one form of the invention, economical means for facilitating the mounting of the buzzer on an external supporting element of differing thickness.

A further object of the invention is to provide a self-fused buzzer which turns off in a safe manner when energized longer than a predetermined time interval.

Other objects and advantages of the invention will be apparent from the disclosure hereof.

DESCRIPTION OF THE DRAWINGS

FIG. 1 is a longitudinal sectional view of an embodiment of the invention.

FIG. 2 is a fragmentary cross-sectional view taken on the line 2—2 of FIG. 1.

FIG. 3 is a fragmentary cross-sectional view taken on the line 3—3 of FIG. 1.

FIG. 4 is a cross-sectional plan view taken on the line 4—4 of FIG. 1.

FIG. 5 is a side elevational view of the embodiment of FIGS. 1-4, showing the procedure of mounting the buzzer on an external supporting surface.

FIG. 6 is a fragmentary detail view taken on the line 6—6 of FIG. 1.

DESCRIPTION OF THE PREFERRED EMBODIMENT

Referring to FIGS. 1 and 5, the preferred embodiment of the invention includes a plastic bobbin or inner member 10 having a hollow cylindrical spool portion 12 with spaced transverse ends 14 and 16. A coil 18 of magnet wire is wound on bobbin spool 12 and has its ends soldered to terminals 20 which are mounted on bobbin ends 16 in a novel manner to be described hereinafter.

Bobbin 10 is clamped in a relatively rigid U-shaped ferromagnetic frame 24 which has a flat lower arm 26 and a slightly-angled upper arm 28. Upper arm 28 is bent in a shallow V-shape with the apex 30 of the V directed toward bobbin end 16 and aligned with a diameter of the bore of bobbin spool 12.

A circular opening 32 (FIG. 4) with radial peripheral slots 36 is formed in upper frame arm 28 and coacts with bobbin bosses 34 (FIG. 1) to align hole 32 of the frame with the bore in the bobbin 10. Slots 36 and bosses 34 are aligned with the longitudinal axis 38 (FIG. 4) of bobbin 10 and frame 24.

As shown in FIG. 2, terminals 20 have lower portions 40 which are bent at right angles to the upper portion 41 of terminals 20 and fit into pockets 42 in upper bobbin end 16. Each lower terminal portion 40 has an interior opening 44 (FIG. 2). A boss 46 is formed in the upper surface of plastic bobbin end 16 above each opening 44. Two additional bosses 48 (FIG. 4) are formed in the upper surface of bobbin end 16 adjacent opposite side edges of lower terminal portions 40. All of the plastic bosses 46 and 48 are pressed down from the dotted line position of FIG. 2 to the full line position after lower terminal portions 40 have been inserted in pockets 42, the downward pressure on plastic bosses 46 and 48 being sufficient to extrude plastic material from the top wall of pocket 42 into openings 44 of terminal portions 40, as shown at 50 in FIG. 2, and also to press plastic material into pockets 42 to embrace the side edges of terminal portions 40, thereby securely fastening terminals 20 to bobbin end 16 and preventing terminals 20 from being pulled out of pockets 42 or from being displaced sideways in pockets 42.

A cylindrical, ferromagnetic core 52 is axially movable in the bore of bobbin spool 12 and projects through the opening 32 (FIG. 4) in upper frame arm 28. A small leaf spring 54, which is seated in a recess 56 in lower bobbin end 14, normally urges core 52 upwardly. As shown in FIG. 6, leaf spring 54 has a central portion 58 and two side portions 60. Central portion 58 is offset upwardly with respect to side portions 60, the latter normally resting on the lower frame arm 26. One corner (FIG. 6) of both leaf spring 54 and recess 56 are tapered as at 62 to prevent leaf spring 56 from being oriented the wrong way with respect to core 52. when the buzzer is being assembled.

In the operation of this embodiment, alternating current in coil 18 produces an alternating magnetic field which periodically rises to a maximum and then drops to zero. As this magnetic field rises, it causes core 52 to move downwardly against the force of upwardly-bent spring portion 58 and to strike the side spring portions 60, which in turn strike lower frame arm 26. When the magnetic field drops to zero, the force of leaf spring portion 58 moves core 52 back to its original position. The periodic striking of spring portions 60 and lower frame arm 26 by core 52 produces a crisp buzzing sound which is more pleasant than that of prior art buzzers and is free of the inherent harmonics caused by the flexing frame of the prior art buzzers.

A compact molded plastic housing 64 encloses bobbin 10, coil 18, and the upper portion of frame 24. Terminals 20 project through slots 21 in the closed end of housing 64, the other end of housing 64 being open. The lower side portion of housing 64 has longitudinal slots 66 on opposite sides thereof (FIGS. 3 and 5) which have a snap interaction with chamfered tabs 68 on the bottom edge of bobbin end 14 to lock housing 64 on bobbin 10 when housing 64 is pushed downwardly during assembly.

The inside corners of housing 64 are shaped to form generally triangular corner posts 70 (FIG. 4) which have flat lower ends 72 (FIG. 3) that are positioned to act as abutments to limit the downward movement of housing 64 relative to bobbin end 14 during assembly.

In this particular embodiment, core 52 has a cutoff burr 53 on its upper end, and a recess 55 is formed in housing 64 opposite burr 53 so that the top of housing 64 will act as a stop for core 52 without damage to housing 64 due to burr 53.

A stud 74 (FIGS. 1 and 4) projects from the central portion on one side of housing 64 through a counterbored hole 76 (FIG. 1) in lower frame arm 26. Housing 64 is made of a thermoplastic material and the downwardly-projecting end of stud 74 is heated to cause it to be staked outwardly as at 75 within counterbored hole 76 to help secure housing 64 to lower frame arm 26.

For securing the buzzer to an external supporting element, a hook 78 (FIGS. 1 and 5) and a hole 80 are formed in opposite end portions of lower frame arm 26. Hook 78 is punched out of the metal near a corner portion of the U-shaped frame 24 and has its lowermost portion 81 (FIG. 1) located directly below the adjacent lower edge 82 of housing 64. From lowermost portion 81, hook 78 extends upwardly toward the plane 27 of frame arm 26 and terminates in an end portion 84 which is aligned with said plane. The adjacent lower edge 82 of housing 64 is chamfered to coact with hook 78 in engaging supporting elements of different thickness.

To mount the buzzer on a support element, hook 78 is inserted at an angle through a hole 79 (FIG. 5) in the external supporting element 83, and the buzzer is then rocked about chamfered edge 82 until lower frame arm 26 is flat on the supporting surface with hole 80 aligned above another hole 85 in the supporting element 83, the hook serving both as a fulcrum during connection and as a final connector. The buzzer can then be securely fastened to the supporting element 83 by means of a single screw inserted through holes 80 and 85. For relatively thick supporting elements, the hook end portion 84 yields when the buzzer is rocked about chamfered housing edge 82 to bring lower frame arm 26 into contact with the supporting element. Thus, the particular shape and yieldability of hook 78 permit the buzzer to be quickly and securely mounted on supporting elements of differing thicknesses, as long as the supporting elements have registrable holes 78 and 80 drilled therein.

In the past, it has been customary to wrap electrical insulating material around buzzer coils. However, in this embodiment of the invention such insulation is replaced by a relatively stiff insulation shield 86 (FIGS. 1 and 4) which is positioned between the outside winding layer of coil 18 and the adjacent exposed portion of frame 24. Insulation shield 86 can be made of fish paper, which is a vulcanized fiber material, or any other suitable insulating material. In the event that coil 18 shorts or fuses, the wire ends exposed thereby can only contact bobbin ends 14 and 16, housing 64, or insulation shield 86, all of which are made of insulating material, thereby insuring that the buzzer will fail safe. The advantage of insulation shield 86 over the prior art insulation wrapping is that shield 86 will not scorch or burn in the event that coil 18 overheats or fuses. The insulating shield 86 has resilient side portions 87 (FIG. 4) which are urged by their inherent characteristics against the sides of the housing 64, thereby providing a barrier within the case which is of slightly variable width to compensate for any manufacturing inaccuracies.

The above-described embodiment of the invention is well adapted for use in intermittent duty where the buzzer is activated for only 1 or 2 seconds and is then shutt off by a control circuit, except where there is a circuit malfunction and is also suitable for continuous duty use. In this intermittent application, prolonged operation of the buzzer, e.g. longer than 3 minutes, may be undesirable and, therefore, a fail-safe, self-turning off type of operation is obtained by winding coil 18 with relatively fine gauge wire to heat the wire to the insulation breakdown temperature if the normal voltage is applied across the coil beyond a predetermined time limit, e.g. 3 minutes. Insulation breakdown in the wire of coil 18 leads to massive shorted turns which abruptly increases current flow through the coil and causes the coil wire to melt in a fuse-like fashion and open the coil. The self-turning off feature is safe and produces less smoke than the lighting of a match. This is partially due to the fact that the customary insulation layer around coil 18 has been replaced by spaced insulation shield 86 which is normally not affected by the heat generated when coil 19 self-turns off.

Various changes and modifications may be made without departing from the spirit of the invention, and all of such changes are contemplated as may come within the scope of the claims.

What is claimed is:

1. In an electrical device having a flat metal frame portion with a mounting aperture on one side thereof and having a corner at which said metal frame portion is bent, the improvement comprising a hook formed from a portion of said frame at said corner and bent to project at an oblique angle below the frame with the deepest part of said hook being reversely bent under the corner and toward the plane of the lower surface of said metal frame so as to serve as a connector and as a fulcrum in connecting the frame to an apertured supporting plate, and in which the metal of the hook is yieldable as the device is fulcrumed about the hook to adapt to different thicknesses of supporting plates and enable registration of the mounting aperture.

2. In an electrical device having a flat metal frame portion on one side thereof and having a corner at which said metal frame portion is bent, the improvement comprising a hook formed from a portion of said frame at said corner and bent to project angularly below the frame with the deepest part of said hook under said corner and the end of said hook being reversely bent toward the plane of the lower surface of said metal frame so as to serve as a connector and as a fulcrum in connecting the frame to an apertured supporting plate, and wherein said device is enclosed in a housing and wherein the edge of said housing adjacent to the corner bend of said frame is chamfered.

* * * * *